United States Patent
Minabe et al.

(10) Patent No.: US 6,504,992 B1
(45) Date of Patent: Jan. 7, 2003

(54) VIDEO SIGNAL REPRODUCING APPARATUS AND VIDEO SIGNAL DISPLAY APPARATUS

(75) Inventors: Kouji Minabe, Hitachiota (JP); Masayuki Kijima, Kumamoto (JP); Hideo Nishijima, Hitachinaka (JP); Teruo Hoshi, Hitachinaka (JP); Takashi Tsujio, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/305,451

(22) Filed: May 6, 1999

(30) Foreign Application Priority Data

May 8, 1998 (JP) .......................................... 10-125640

(51) Int. Cl.[7] .................................................. H04N 5/91
(52) U.S. Cl. ............................ 386/68; 386/46; 386/117; 358/906
(58) Field of Search .......................... 386/117, 46, 68; 358/906; 345/87, 589, 690; H04N 5/91

(56) References Cited

U.S. PATENT DOCUMENTS

| | | | |
|---|---|---|---|
| 5,155,477 A | * 10/1992 | Shirochi | 345/87 |
| 5,638,484 A | * 6/1997 | Tun | 386/79 |
| 5,729,649 A | 3/1998 | Lane et al. | |
| 6,026,211 A | * 2/2000 | Nakamura et al. | 386/46 |
| 6,219,489 B1 | * 4/2001 | Ohta et al. | 386/117 |
| 6,278,496 B1 | * 8/2001 | Kitagawa et al. | 345/674 |
| 6,281,871 B1 | * 8/2002 | Nohara | 345/87 |

FOREIGN PATENT DOCUMENTS

| | | |
|---|---|---|
| EP | 0 369 481 A2 | 5/1990 |
| WO | WO 97/21306 | 6/1997 |

* cited by examiner

Primary Examiner—Vincent Boccio
Assistant Examiner—James A Fletcher
(74) Attorney, Agent, or Firm—Antonelli, Terry, Stout & Kraus, LLP

(57) ABSTRACT

When a video signal reproduced by a helical scan type video signal reproducing apparatus is displayed on the screen of a liquid crystal matrix circuit, a change in brightness on the screen is eliminated in a mode for displaying a trick reproduced image such as a noiseless search image, a still image or the like with respect to a mode for displaying a normally reproduced image, thus providing the user with displayed images causing a less feeling of strangeness. During normal reproduction, where a video signal is continuously written into a liquid crystal display circuit, the brightness of the liquid crystal display circuit is controlled based on the value in a reference brightness register set by the user. During trick reproduction, where a video signal is discontinuously written into the liquid crystal display circuit, the liquid crystal display circuit is controlled to display an image relatively darker than the value in the reference brightness register. This eliminates the difference in brightness between a normally reproduced image and a trick reproduced image, thereby allowing the user to have a less feeling of strangeness.

14 Claims, 4 Drawing Sheets

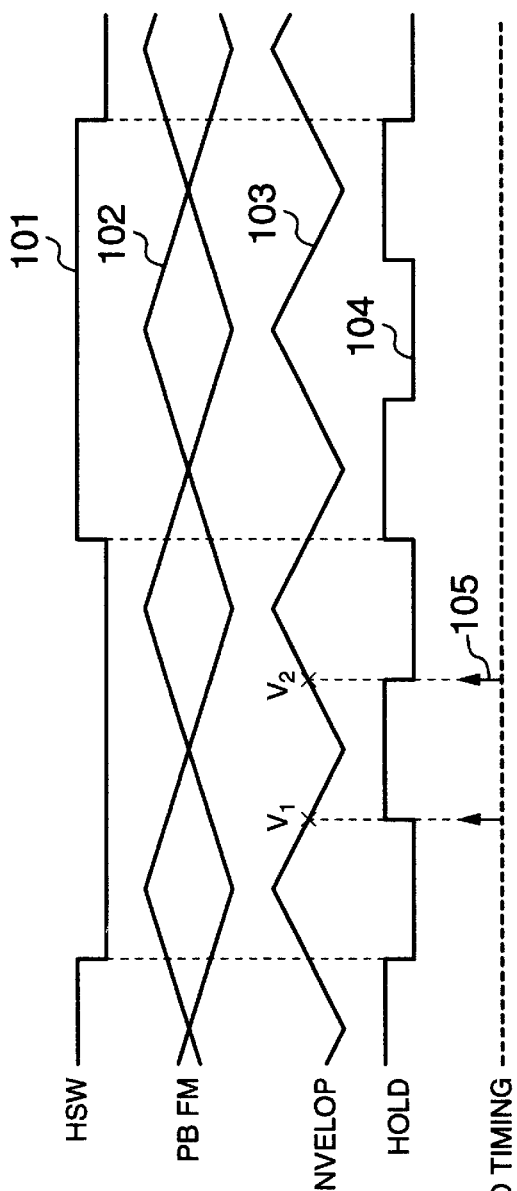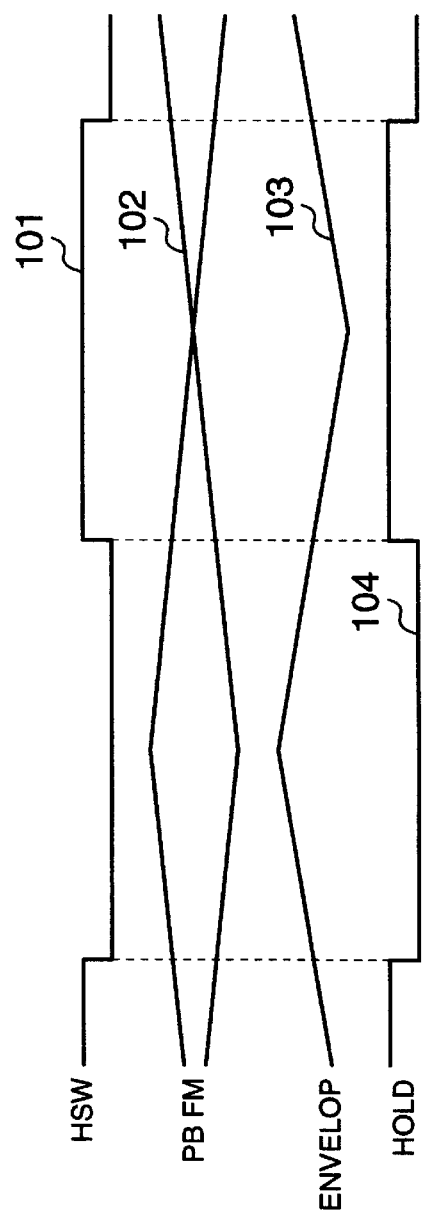

VIDEO SIGNAL REPRODUCING APPARATUS AND VIDEO SIGNAL DISPLAY APPARATUS

BACKGROUND OF THE INVENTION

1. Field of the Invention

The present invention relates to a video signal reproducing apparatus comprising a display means for displaying a reproduced video signal, and a video signal display apparatus, and more particularly to such apparatus suitable for displaying a video image on a liquid crystal display means.

2. Description of the Related Art

A helical scan type video signal reproducing apparatus generally reproduces a signal with at least two magnetic heads (hereinafter referred to as "CH1 head" and "CH2 head") mounted on a rotary drum and having different azimuth angles. A magnetic tape has oblique tracks on which a video signal is recorded. The oblique tracks are alternately formed by the respective magnetic heads at azimuth angles equal to those of the corresponding magnetic heads. When this magnetic tape is driven for reproduction at a velocity n times (n is an integer) higher than a recording speed, each of the magnetic heads reproduces a signal while traversing (n−1) tracks (at an equal velocity (n=1), the magnetic head does not traverse any tracks since the magnetic head scans the tape at an oblique angle equal to an oblique angle of the tracks when they were recorded). Thus, an even number of tracks are traversed by the magnetic head when n is an odd number, while an odd number of tracks are traversed when n is an even number (including n=0).

On the other hand, each of the magnetic heads outputs a reproduced signal only when it scans a track which has the same azimuth angle, and outputs a noise signal when it scans a track which has a different azimuth angle. Therefore, when reproduction is performed, for example, at a velocity four times higher (n=4), the magnetic heads each traverse three tracks. In this event, if a CH1 head reproduces in order a track with the same azimuth angle, a track with a different azimuth angle, and a track with the same azimuth angle, a CH2 head reproduces in order a track with the different azimuth angle, a track with the same azimuth angle, and a track with the different azimuth angle. Stated another way, when reproduction is performed at a velocity even-number times higher, the CH1 head and the CH2 head reproduce signals whose envelope is in an opposite phase relationship (complementary).

When video signals reproduced by the above-mentioned magnetic heads are displayed on a display means having a memory effect, such as a liquid crystal display device, the display operation utilizes the opposite phase relationship between reproduced signals of the respective magnetic heads. By writing outputs of the CH1 head and the CH2 head into the display means only during a period in which effective reproduced signals are being outputted, a favorable noise-free search image or still image (when n=0) can be reproduced over the entire screen.

The prior art related to a video signal reproducing apparatus for providing such a favorable noise-free trick reproduced signal is disclosed, for example, in JP-A-8-65636 and JP-A-9-106502 which describe a video signal processing apparatus.

BRIEF SUMMARY OF THE INVENTION

It is an object of the present invention to provide a display apparatus, and a reproducing apparatus comprising the same, which prevent a displayed video image from changing into a brighter or darker image, so that the user will not have a feeling of strangeness in the progress of the displayed video image, even if a video signal is discontinuously written into a liquid crystal display means or any other video display means which has a memory effect.

More specifically, when a video signal is discontinuously written into the liquid crystal display means as mentioned above, the amount of polarization of liquid crystal is gradually attenuated during a period in which the video signal is not written. For this reason, with a liquid crystal display means having a back light function, light from a back light source more easily transmits the liquid crystal. Likewise, with a liquid crystal display means having a reflector, reflected light more easily transmits the liquid crystal. In other words, this means that a displayed video image changes in a brighter direction. Thus, as compared with normal reproduction (when n=1) where a video signal is continuously written into the liquid crystal display means, a displayed video image becomes brighter when trick reproduction (n is an even integer) is performed to discontinuously write a video signal into the liquid crystal display means, resulting in giving the user a feeling of strangeness.

This phenomenon constitutes a problem which arises not only in the liquid crystal display means but also similarly in a video display means which displays a video image while accumulating the level of the video signal in analog amount. In the latter case, a displayed video image may change in a brighter or darker direction depending on the characteristics of a particular video display means.

To solve the problem mentioned above, the present invention has taken the following measures.

A video signal reproducing apparatus according to the present invention is a helical scan type video signal reproducing apparatus for reproducing a video signal from a magnetic tape wrapped around a rotary drum having magnetic heads mounted thereon. The apparatus comprises a tape driving controller for controlling driving of the magnetic tape, a reproduced signal processing circuit for processing output signals from the magnetic heads to generate a reproduced video signal, a liquid crystal display circuit for displaying the reproduced video signal, a write controller for writing the reproduced video signal into the liquid crystal display circuit, and a brightness controller for controlling the brightness for the liquid crystal display circuit. The brightness controller controls the liquid crystal display circuit to display a brighter image thereon when the write controller continuously writes the reproduced video signal into the liquid crystal display circuit, while the brightness controller controls the liquid crystal display circuit to display a darker image thereon when the write controller discontinuously writes the reproduced video signal into the liquid crystal display circuit.

With the configuration set forth above, it is possible to control the brightness for the liquid crystal display circuit at the same level both when a video signal is continuously written into the liquid crystal display circuit and when a video signal is discontinuously written into the liquid crystal display circuit, thereby suppressing a feeling of visual strangeness.

Specifically, the write controller discontinuously writes a reproduced video signal into the liquid crystal display circuit when the magnetic heads each scan the oblique tracks on the magnetic tape at an oblique angle different from the oblique angles of the oblique tracks, and the tape driving controller controls driving of the magnetic tape such that envelope of signals reproduced from the plurality of magnetic heads is in an alternately opposite phase relationship. The write controller writes the reproduced video signal into the liquid crystal display circuit during a period in which the magnetic heads reproduce tracks with the same azimuth angles, and the write controller controls to stop writing the reproduced video signal into the liquid crystal display circuit during a period in which the magnetic heads reproduce tracks with different azimuth angles.

The video signal reproducing apparatus according to the present invention further comprises a reference brightness register for supplying the brightness controller with reference brightness. Specifically, the brightness controller controls the brightness for the liquid crystal display circuit based on the reference brightness when the write controller continuously writes a reproduced video signal into the liquid crystal display circuit, and the brightness controller controls the liquid crystal display circuit to display an image of brightness lower than the reference brightness when the write controller discontinuously writes a reproduced video signal into the liquid crystal display circuit. In addition, an input terminal is provided for the user to set the reference brightness supplied by the reference brightness register.

Thus, the brightness of a displayed video image is controlled at brightness set by the user himself in either of a mode in which a video signal is continuously written and a mode in which a video signal is discontinuously written, thereby making it possible to provide the user with more consistent images on the liquid crystal display circuit.

Specifically, the brightness controller may be an amplitude controller for controlling the amplitude of a video signal written into a liquid crystal matrix circuit (brightness controller) or a controller for controlling the center of control in the liquid crystal matrix circuit of a video signal written into the liquid crystal matrix circuit (contrast controller).

Another video signal reproducing apparatus according to the present invention is a helical scan type video signal reproducing apparatus which comprises a tape driving controller, a reproduced signal processing circuit, a liquid crystal display circuit, and a brightness controller for controlling the brightness for the liquid crystal display circuit. The brightness controller controls the liquid crystal display circuit to display a darker image thereon when the tape driving controller controls the magnetic tape to run at a velocity even-number times (the even-number may be zero) as high as a velocity at which a video signal was recorded on the magnetic tape. On the other hand, the brightness controller controls the liquid crystal display circuit to display a brighter image thereon when the tape driving controller controls the magnetic tape to run at a velocity odd-number times as high as a velocity at which a video signal was recorded on the magnetic tape. With this configuration, the brightness of a displayed image can also be controlled appropriately in a manner similar to the aforementioned video signal reproducing apparatus.

In another aspect, a video display apparatus according to the present invention comprises a liquid crystal display circuit, a write controller, and a brightness controller for controlling the brightness for the liquid crystal display circuit. The brightness controller controls the liquid crystal display circuit to display a brighter image thereon when the write controller continuously writes a video signal into the liquid crystal display circuit, and the brightness controller controls the liquid crystal display circuit to display a darker image thereon when the write controller discontinuously writes a video signal into the liquid crystal display circuit.

Another video display apparatus according to the present invention comprises a display device, having a memory effect, for displaying a video signal, a write controller, and a brightness controller for controlling the brightness for the display device. When the display device has a characteristic of displaying a brighter video image as a write period is longer, the brightness controller controls the display device to display a brighter video image thereon when the write controller continuously writes a reproduced video signal into the display device, and the brightness controller controls the display device to display a darker video image thereon when the write controller discontinuously writes a reproduced video signal into the display device. On the other hand, when the display device has a characteristic of displaying a darker video image as the write period is longer, the brightness controller controls the display device to display a darker image thereon when the write controller continuously writes a reproduced video signal into the display device, and the brightness controller controls the display device to display a brighter image thereon when the write controller discontinuously writes a reproduced video signal into the display device.

BRIEF DESCRIPTION OF THE SEVERAL VIEWS OF THE DRAWINGS

These and other objects, features and advantages of the present invention will become more readily apparent from the following detailed description when taken in conjunction with the accompanying drawings wherein:

FIG. 2 includes several waveform charts showing the operation of the reproducing apparatus according to the embodiment of the present invention during fast forward reproduction and rewind reproduction;

FIG. 3 includes several waveform charts showing the operation of the reproducing apparatus according to the embodiment of the present invention during still image reproduction;

DETAILED DESCRIPTION OF THE INVENTION

Figure 1:
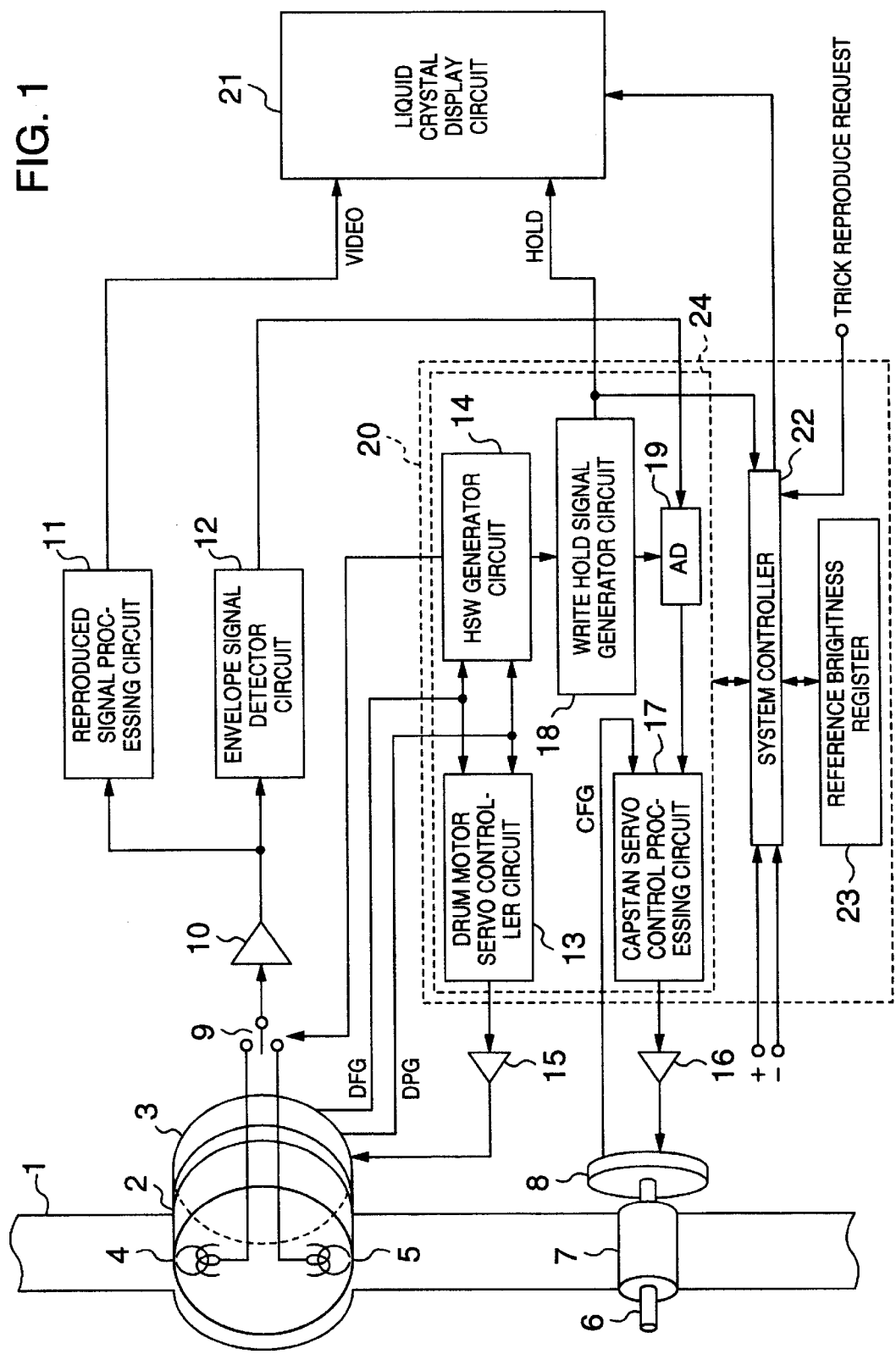
FIG. 1 is a block diagram illustrating the configuration of a reproducing apparatus according to an embodiment of the present invention.

An embodiment of the present invention will hereinafter be described with reference to FIGS. 1 to 6. To begin with, the configuration of a video signal reproducing apparatus according to an embodiment will be described with reference to FIG. 1. First, a mechanical system comprises a magnetic tape 1; a rotary drum 2 having magnetic heads 4, 5 mounted thereon; a drum motor 3 for rotating the rotary drum 2; a capstan shaft 6; a pinch roller 7; and a capstan motor 8.

Next, a signal processing system comprises a head switch 9 for switching signals from the magnetic heads 4, 5; a preamplifier 10 for amplifying output signals of the magnetic heads 4, 5; a reproduced video signal processing circuit 11 for modulating and equalizing an output signal from the preamplifier 10 to recover a reproduced video signal; an envelope signal detector circuit 12 for detecting an amplitude component of the output signal from the preamplifier 10; and a liquid crystal display circuit 21.

A motor control system 24 in turn comprises a drum motor servo controller circuit 13 for controlling the rotational speed and phase of the drum motor 3 in response to a rectangular wave signal at a frequency proportional to the rotating frequency of the drum motor 3 (hereinafter referred to as the "DFG (Drum Frequency Generator) signal") and a signal indicative of the rotating phase of the drum motor 3 (hereinafter referred to as the "DPG (Drum Phase Generator) signal"); a head switch signal generator circuit 14 for generating switching timing for the heads 4, 5 from the DPG signal or the DFG signal referenced by the DPG signal; a power amplifier circuit 15 for producing electric power for driving the drum motor 3 and a driver circuit 16 for driving a multi-phase motor; a capstan servo control processing circuit 17 for controlling the tape running speed and phase from a rectangular wave signal at a frequency proportional to the rotating frequency of the capstan motor 8 (hereinafter referred to as the "CFG (Capstan Frequency Generator) signal") and a tape running phase error signal; a write hold signal generator circuit 18 for disabling/enabling update of data for the liquid crystal display circuit 21 based on the timing of a head switch signal; and an analog-to-digital converter circuit 19 (hereinafter refereed to as the "AD" circuit).

The video signal reproducing apparatus further comprises a system controller 22 for giving a variety of operation instructions to the entire system and a reference brightness register 23 for storing a control value for the brightness of the liquid crystal display circuit 21, which may be set by the user.

It should be noted that although portions of electrical processing are all expressed in the form of circuits for convenience of describing the configuration, functions surrounded by a dotted box 20, for example, may be replaced with an appropriate microcomputer to implement them in software.

Next, the operation of the reproducing apparatus according to this embodiment during trick reproduction will be described with reference to FIGS. 2 and 3. Signals recorded on helically scanned tracks on the tape 1 are reproduced by the two magnetic heads 4, 5 mounted on the head drum 2, and alternately selected and read by the head switch 9. Then, the read signal is amplified by the preamplifier 10, and subsequently supplied to the reproduced signal processing circuit 11 and to the envelope signal detector circuit 12. The reproduced signal processing circuit 11 performs demodulation and equalization processing on the supplied signal to recover a video signal which is then supplied to the liquid crystal display circuit 21.

The drum motor servo controller circuit 13 in turn generates a control signal for maintaining the period of the DFG signal constant, and controls the rotation phase with respect to the tape 1 through the DPG signal. In this way, the drum motor 3 is controlled with respect to the speed and phase. The capstan servo control processing circuit 17 generates a velocity control signal for maintaining the period of the CFG signal constant.

During fast forward or fast rewind viewing reproduction (hereinafter referred to as "during a search"), the capstan motor 8 is controlled to transport the tape 1 at a velocity substantially even-number times higher than the velocity at which the tape 1 was recorded. Then, a phase control signal for the capstan motor 8 is generated in the following manner. First, the envelope signal detector circuit 12 detects amplitude components of signals read from the tape 1, and inputs the detected signal to the AD converter circuit 19. Assuming that the tape 1 is controlled to run at a velocity substantially four times higher than the velocity at which the tape 1 was recorded, the output signal of the envelope signal detector circuit 12 and other signals at the respective circuit components in FIG. 1 are as illustrated in the waveform charts of FIG. 2. Specifically, FIG. 2 illustrates a switching signal 101 supplied to the head switch 9; an output signal 102 of the head switch 9; the output signal 103 of the envelope signal detector circuit 12; an output signal 104 of the write hold signal generator circuit 18; and sampling timing 105 of the AD converter circuit 19.

When helically scanned tracks on the tape 1 are reproduced at a velocity four times (2m times in general) higher than the velocity during recording, the heads 4, 5 traverse and scan a total of three (|2m−1| in general) tracks while the head drum 2 rotates once. Since the heads 4, 5 are given different azimuth angles, each of the output signals 102 exhibits a maximum level when an associated head traverses a track having the same azimuth angle as the head, and a minimum level when the head traverses a track having a different azimuth angle. The signal 103 is derived by detecting the envelope of the output signals 102. Thus, the write hold signal generator circuit 18 multiplies the output signal of the head switch signal generator circuit 14 by substantially three (|2m−1| in general), and applies the multiplied signal, i.e., a write hold signal (Hold in FIG. 2) to the liquid crystal display circuit 21. Also, the write hold signal generator circuit 18 forces the AD converter circuit 19 to sample the envelope detection signal 103 at the timing of a rising edge and the subsequent falling edge of the write hold signal. The capstan servo processing circuit 17 processes the difference between the sample values at the two sampling points as an error signal indicative of an error in tape running phase to control the tape running phase. As a result, the tape running phase is controlled such that a level of the envelope detection signal in the vicinity of a median point is synchronized with the rising and falling edges of the write hold timing signal.

Also, in this method, if both of the two heads 4, were used to individually sample the envelope signal 103 to calculate the difference, the respective heads 4, 5 might possibly calculate different phase error signals if the heads 4, 5 produced varying outputs. For this reason, only one of the heads is used to sample the envelope signal 103 for calculating the phase error. This results in stabilized switching timing of the write hold signal even if the outputs of the heads 4, 5 present variations.

In the foregoing manner, the capstan motor 8 is controlled with respect to the speed and phase. Simultaneously, the write hold signal generator circuit 18 also generates a write hold signal for disabling/enabling update of data in the liquid crystal display circuit 21. Here, since the tape velocity is controlled to be even-number times higher, the envelope detection signal and the write hold signal both exhibit an opposite phase relationship for the head 4 and the head 5. Thus, by disabling update of data during a high level of the write hold signal, a lower level portion of the envelope detection signal, i.e., a signal during a noise output period is prevented from being displayed on the screen. The drum motor 3 and the capstan motor 8 are driven by associated signals which have been amplified in power by the processing circuits 15, 16, respectively.

Next, when a still image is reproduced, the tape 1 is forced to stand still at a phase at which one of the heads 4, 5 delivers an increasing output and the other one delivers a decreasing output, as illustrated in FIG. 3. For controlling the tape 1 in this way, for example, the system controller 22 instructs the capstan motor 8 to stop after the lapse of a predetermined time with reference to the phase of the head switch signal.

In this event, the write hold signal generator circuit 18 generates a signal in phase with the head switch signal, for example, as illustrated in FIG. 3 and writes output signal of only one head into the liquid crystal display circuit 21, with the result that a noise-free still image can be displayed.

When the tape 1 is driven at the same velocity as that during recording to reproduce oblique tracks on the tape 1, the resulting envelope signal of output signals from the heads 4, 5 presents a square waveform (not shown). When the tape 1 is driven at a velocity odd-number times higher than that during recording, the resulting envelope signal of output signals from the heads 4, 5 presents a triangular waveform, however, the outputs of the heads 4, 5 are in phase (not shown). Thus, the system controller 22 controls the write hold signal generator circuit 18 not to output the write hold timing signal to the liquid crystal display circuit 21 during reproduction at a velocity odd-number, including one, times higher than that during recording.

Figure 4:
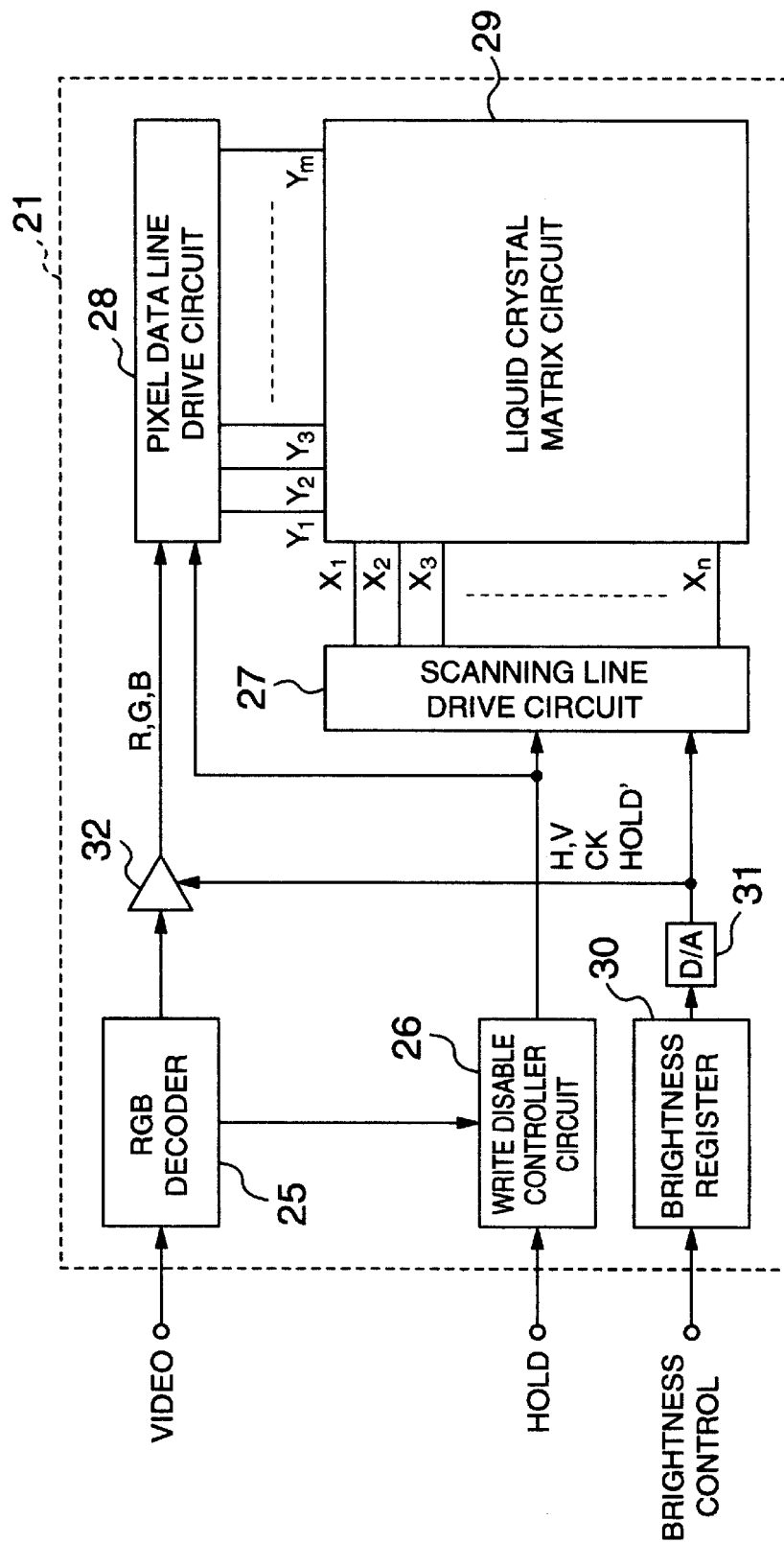
FIG. 4 is a block diagram illustrating an example of the internal configuration of a liquid crystal display circuit.

Next, a specific example of the liquid crystal display circuit 21 will be illustrated with reference to FIGS. 4, 5. Referring first to FIG. 4, the liquid crystal display circuit 21 comprises an RGB decoder 25; a write disable controller circuit 26; a scanning line drive circuit 27; a pixel data line drive circuit 28; a liquid crystal matrix circuit 29; a register 30 for storing a brightness control value sent thereto from the system controller 22; a digital-to-analog (DA) converter 31 for converting the control value to an analog signal; and an amplifier 32 for controlling the amplitude and operating point of a video signal to be written.

Figure 5:
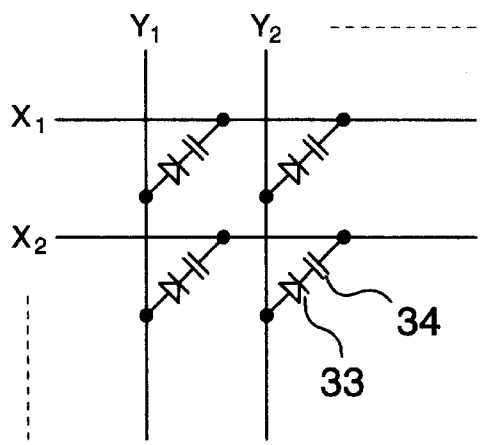
FIG. 5 is a circuit diagram illustrating an example of the configuration of a liquid crystal matrix circuit.

FIG. 5 illustrates an example of the internal configuration of the matrix 29 of liquid crystal display pixels, each of which is composed of a liquid crystal element 34 and a diode 33 for preventing a video signal written into the liquid crystal element 34 from discharging.

Next, the operation of the liquid crystal display circuit 21 will be described referring again to FIG. 4. A reproduced video signal outputted from the reproduced signal processing circuit 11 is inputted to the RGB decoder 25 which recovers three primary colors from the reproduced video signal. The RGB decoder 22 also separates synchronization signals multiplexed on the video signal and inputs the same into the write disable controller circuit 26. The write disable controller circuit 26 separates from the synchronization signals a horizontal synchronization signal and a vertical synchronization signal, mainly required by the scanning line drive circuit 27; generates a dot clock, mainly required by the pixel data line drive circuit 28; and appropriately processes the write hold signal for disabling/enabling update of data and inputs the processed write hold signal to the respective drive circuits 27, 28. The respective drive circuits 27, 28, for giving respective gradation levels to respective pixels, sequentially generate potential differences on horizontal lines and vertical lines illustrated in FIG. 5 to turn on only diodes of selected pixels so that the respective liquid crystal elements thus selected are applied with respective potential differences. Thus, when the write hold signal is at high level, update of data can be disabled only by preventing the drive circuits 27, 28 from generating the potential differences.

It should be understood however that even if the diode 33 is controlled to turn off, the circuit is not completely shut off, but instead, the resistance of the diode 33 merely becomes extremely high. For this reason, the potential difference across the liquid crystal element 34 is gradually discharged during a period in which no signal is being written thereinto.

Generally, a liquid crystal element changes the amount of polarized light when it is applied with a potential difference. As a result, with a reflection type liquid crystal display circuit, when light impinging on a reflector plate (not shown) disposed at the back of the liquid crystal matrix circuit 29 passes through the liquid crystal matrix circuit 29, a portion of which is applied with a potential difference to polarize the light and hence reduce the transmissivity, that portion becomes darker. This is also true when a light source, generally referred to as so-called "back light" (not shown) is disposed at the back of the liquid crystal matrix circuit 29. In this way, a color video image is displayed by providing contract for each of the three primary colors R, G, B.

For the reason discussed above, when the liquid crystal display circuit 21 is left without any video signal written thereinto, a potential difference across each liquid crystal element is gradually discharged to increase the transmissivity, whereby a displayed video image becomes gradually brighter and eventually ends up in a white image (i.e., reflected light or light from a back light source transmitting the liquid crystal matrix circuit 29 is viewed as it is).

During normal reproduction, a video signal is sequentially written into each liquid crystal element at a field period or a frame period of the video signal. However, during the aforementioned search at a velocity even-number times higher or during still image reproduction, a video signal is written at a period double the period during reproduction at velocity odd-number times higher. Therefore, a video image displayed during the search at a velocity even-number times higher or during the still image reproduction becomes slightly brighter, as compared with the brightness of a video image displayed during reproduction at a velocity odd-number, including one, times higher, because of a longer discharge duration.

To solve this problem, the liquid crystal display circuit 21 is controlled for brightness in the following manner to suppress variations in brightness between a displayed video image reproduced at a velocity odd-number, including one, times higher and a displayed video image reproduced at a velocity even-number times higher or a reproduced still image, thereby allowing the user to have a less feeling of strangeness.

First, the user gives an instruction to the system controller 22 in FIG. 1 through keys or the like (not shown) arranged on the apparatus in order to set appropriate brightness for a displayed video image in the liquid crystal display circuit 21 in accordance with a particular environment in which the apparatus is used. For example, the system controller 22 increases the value in the reference brightness register 23 when an instruction is given to a "+" terminal in FIG. 1, and decreases the value in the reference brightness register 23 when an instruction is given to a "−" terminal.

Next, the system controller 22 reads the value in the reference brightness register 23 and sends the read value to the liquid crystal display circuit 21. The liquid crystal display circuit 21 receives and stores this value in the brightness register 30 in FIG. 4, and converts the value to an analog signal through the digital-to-analog converter 31. This analog signal causes the amplifier 32 to change the amplification ratio or an operation point to control a potential difference of a video signal that is written into the liquid crystal element 34 of the liquid crystal matrix circuit 29. Alternatively, the brightness may be changed by controlling potentials set to the scanning line drive circuit 27. In the manner described above, the user first controls the brightness of a desired video image displayed during reproduction at a velocity odd-number, including one, times higher.

On the other hand, upon receipt of a request from the user for the aforementioned search at a velocity even-number times higher or for trick reproduction of a still image, the system controller 22 gives corresponding instructions to the respective components of the motor control system 24, causing the motor control system 24 to transition to a motor control target for the search. Also, the system controller 22 corrects a brightness control value based on the value in the reference brightness register 23 to make a displayed video image darker, and sends the brightness control value to the liquid crystal display circuit 21. In this way, the liquid crystal display circuit 21 receives the brightness control value for making the displayed image darker while the displayed video image inherently tends to be brighter during the search or during reproduction of a still image because of a longer write period for the liquid crystal elements. The cancellation of the displayed image tending to be brighter and the brightness control value intended for a darker displayed image results in reducing a change in brightness, viewed from the user, during reproduction at a velocity odd-number, including one, times higher and during the search at a velocity even-number times higher or during reproduction of a still image. In other words, the difference in brightness, viewed from the user, between an image reproduced at a velocity odd-number, including one, times higher and an image reproduced during the search at a velocity even-number times higher or a reproduced still image is previously set as a correction value for the brightness control value in the reference brightness register 23 associated with the system controller 22.

In addition, for switching the brightness control at strict timing, the system controller 22 may monitor when discontinuous writing into the liquid crystal display circuit 21 is executed, relying on information from the motor control unit 24 on how the motors respond or from information on how the write hold timing signal generator circuit 18 outputs the write hold signal, and switch the brightness based on the discontinuous writing, if detected.

Figure 6:
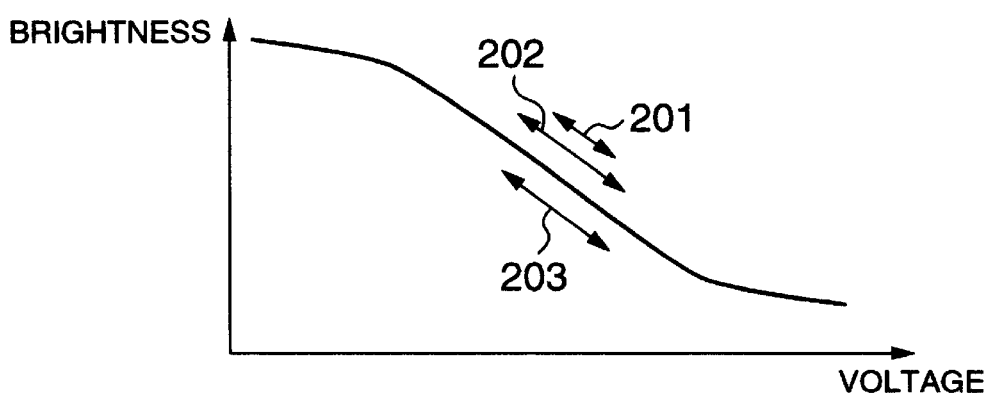
FIG. 6 is a graph illustrating an example of the brightness display characteristic of the liquid crystal display circuit.

The relationship between a voltage across the terminals of a liquid crystal element and the brightness may be illustrated in FIG. 6. Thus, assuming that a video signal is being displayed at a brightness in a range indicated by reference numeral 202 during reproduction at a velocity odd-number, including one, times higher, the brightness may be controlled by reducing the amplitude of a written video signal through the amplifier 32 in FIG. 4 to restrict the brightness to a range indicated by reference numeral 201. Alternatively, the brightness control may be realized by increasing a voltage at the operation point of the amplifier 32 in FIG. 4 and a voltage applied to the scanning line drive circuit 27 to shift the brightness into a range indicated by reference numeral 203.

While the foregoing embodiment has been described generally in connection with a display circuit for a liquid crystal display, a similar control scheme may be applied to any video display means as long as it has the ability of holding a video image to be displayed. In this case, a control scheme similar to the foregoing may be applied if the video display means has a characteristic of displaying a brighter video image as a write period is longer. On the other hand, with a video display means which displays a darker video image as a write period is longer, a video image displayed during a search at a velocity even-number times higher or during still image reproduction may only be controlled to be brighter as compared with the brightness of a video image displayed during reproduction at a velocity odd-number, including one, times higher.

Accordingly, since the present invention can effectively suppress, with a simple configuration, the difference in brightness between a mode in which a video signal is continuously written into a display means and a mode in which a video signal is discontinuously written into the display means, the present invention can advantageously provide the user with a displayed video image free from a feeling of strangeness.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A helical scan type video signal reproducing apparatus for reproducing a video signal from a magnetic tape wrapped around a rotary drum having magnetic heads mounted thereon, said apparatus comprising:

a tape driving controller for controlling driving of said magnetic tape;

a reproduced signal processing circuit for processing output signals from said magnetic heads to generate a reproduced video signal;

a liquid crystal display circuit for displaying said reproduced video signal;

a write controller for writing said reproduced video signal into said liquid crystal display circuit; and a brightness controller for controlling the brightness for said liquid crystal display circuit, wherein said brightness controller controls said liquid crystal display circuit to display a brighter image thereon when said write controller continuously writes said reproduced video signal into said liquid crystal display circuit; and said brightness controller controls said liquid crystal display circuit to display a darker image thereon when said write controller discontinuously writes said reproduced video signal into said liquid crystal display circuit.

2. A video signal reproducing apparatus according to claim 1, wherein:

said magnetic tape has oblique tracks on which signals are recorded with a plurality of azimuth angles, said magnetic heads including a plurality of magnetic heads capable of reproducing said signals with the azimuth angles;

said write controller discontinuously writes said reproduced video signal into said liquid crystal display circuit when:

said magnetic heads each scan said oblique tracks at an oblique angle different from the oblique angles of said oblique tracks, and said tape driving controller controls driving of said magnetic tape such that envelope of signals reproduced from said plurality of magnetic heads is in an alternately opposite phase relationship;

said write controller writes said reproduced video signal into said liquid crystal display circuit during a period in which said magnetic heads reproduce tracks with the same azimuth angles, and said write controller controls to stop writing said reproduced video signal into said liquid crystal display circuit during a period in which said magnetic heads reproduce tracks with different azimuth angles.

3. A video signal reproducing apparatus according to claim 1, further comprising a reference brightness register for supplying said brightness controller with reference brightness, wherein said brightness controller controls the brightness for said liquid crystal display circuit based on said reference brightness when said write controller continuously writes a reproduced video signal into said liquid crystal display circuit; and said brightness controller controls said liquid crystal display circuit to display an image having brightness lower than said reference brightness when said write controller discontinuously writes a reproduced video signal into said liquid crystal display circuit.

4. A video signal reproducing apparatus according to claim 3, further comprising input terminals (+, −) which allow the user to set therethrough said reference brightness supplied by said reference brightness register.

5. A video signal reproducing apparatus according to claim 1, wherein said brightness controller includes an amplitude controller (32) for controlling the amplitude of a video signal written into said liquid crystal display circuit.

6. A video signal reproducing apparatus according to claim 1, wherein said brightness controller includes a controller for controlling the center of control in said liquid crystal display circuit of a video signal written into said liquid crystal display circuit.

7. A helical scan type video signal reproducing apparatus for reproducing a video signal from a magnetic tape wrapped around a rotary drum having magnetic heads mounted thereon, said apparatus comprising:

a tape driving controller for controlling driving of said magnetic tape;

a reproduced signal processing circuit for processing output signals from said magnetic heads to generate a reproduced video signal ;

a liquid crystal display circuit for displaying said reproduced video signal; and a brightness controller for controlling the brightness for said liquid crystal display circuit, wherein said brightness controller controls said liquid crystal display circuit to display a darker image thereon when said tape driving controller controls said magnetic tape to run at a velocity even-number times (the even-number may be zero) as high as a velocity at which the video signal was recorded on said magnetic tape; and said brightness controller controls said liquid crystal display circuit to display a brighter image thereon when said tape driving controller controls said magnetic tape to run at a velocity odd-number times as high as a velocity at which the video signal was recorded on said magnetic tape.

8. A video signal display apparatus comprising:

a liquid crystal display circuit for displaying a video signal;

a write controller for controlling writing of said video signal into said liquid crystal display circuit; and a brightness controller for controlling the brightness for said liquid crystal display circuit, wherein said brightness controller controls said liquid crystal display circuit to display a brighter image thereon when said write controller continuously writes said video signal into said liquid crystal display circuit; and said brightness controller controls said liquid crystal display circuit to display a darker image thereon when said write controller discontinuously writes said video signal into said liquid crystal display circuit.

9. A video signal display apparatus according to claim 8, further comprising a reference brightness register for supplying said brightness controller with a reference brightness, wherein said brightness controller controls the brightness for said liquid crystal display circuit based on said reference brightness when said write controller continuously writes a video signal into said liquid crystal display circuit; and said brightness controller controls said liquid crystal display circuit to display an image having brightness lower than said reference brightness when said write controller discontinuously writes a video signal into said liquid crystal display circuit.

10. A video signal display apparatus according to claim 9, further comprising input terminals (+, −) which allow the user to set therethrough said reference brightness supplied by said reference brightness register.

11. A video signal display apparatus according to claim 8, wherein said brightness controller includes an amplitude controller for controlling the amplitude of a video signal written into said liquid crystal display circuit.

12. A video signal display apparatus according to claim 8, wherein said brightness controller includes a controller for controlling the center of control in said liquid crystal display circuit of a video signal written into said liquid crystal display circuit.

13. A video signal display apparatus comprising:

a display device for displaying a video signal, said display device having a memory effect;

a write controller for controlling writing of said video signal to said display device; and a brightness controller for controlling the brightness for said display device, wherein said display device has a characteristic of displaying a brighter video image as a write period is longer;

said brightness controller controls said display device to display a brighter image thereon when said write controller continuously writes said video signal into said display device; and said brightness controller controls said display device to display a darker image thereon when said write controller discontinuously writes said video signal into said display device.

14. A video signal display apparatus comprising:

a display device for displaying a video signal and having a memory effect;

a write controller for controlling writing of said video signal to said display device; and a brightness controller for controlling the brightness on said display device, wherein said display device has a characteristic of displaying a darker video image as a write period is longer;

said brightness controller controls said display device to display a darker image thereon when said write controller continuously writes said video signal into said display device; and said brightness controller controls said display device to display a brighter image thereon when said write controller discontinuously writes said video signal into said display device.

* * * * *